(12) United States Patent
Bhattarai et al.

(10) Patent No.: US 11,789,513 B1
(45) Date of Patent: *Oct. 17, 2023

(54) POWER MANAGEMENT AND CURRENT/RAMP DETECTION MECHANISM

(71) Applicant: Marvell Asia Pte Ltd, Singapore (SG)

(72) Inventors: Atul Bhattarai, San Jose, CA (US); Srinivas Sripada, Roseville, CA (US); Avinash Sodani, San Jose, CA (US); Michael Dudek, Mission Viejo, CA (US); Darren Walworth, Yorba Linda, CA (US); Roshan Fernando, Beaverton, OR (US); James Irvine, Gilbert, AZ (US); Mani Gopal, San Ramon, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,508

(22) Filed: May 27, 2022

Related U.S. Application Data (63) Continuation of application No. 17/086,264, filed on Oct. 30, 2020, now Pat. No. 11,507,170.

(60) Provisional application No. 62/966,909, filed on Jan. 28, 2020.

(51) Int. Cl.
*G06F 1/3206* (2019.01)
*G06F 11/30* (2006.01)

(52) U.S. Cl.
CPC ........ *G06F 1/3206* (2013.01); *G06F 11/3062* (2013.01)

(58) Field of Classification Search
CPC ........................... G06F 1/3206; G06F 11/3062
See application file for complete search history.

(56) References Cited

U.S. PATENT DOCUMENTS

2002/0093311 A1* 7/2002 Stryker ................. G06F 1/3228
320/135
2020/0363860 A1* 11/2020 Ananthakrishnan ........................
G06F 11/3058

\* cited by examiner

*Primary Examiner* — Gary Collins (57) ABSTRACT

A system includes a multicore chip configured to perform machine learning (ML) operations. The system also includes a power monitoring module configured to measure power consumption of the multicore chip on a main power rail of the multicore chip. The power monitoring module is further configured to assert a signal in response to the measured power consumption exceeding a first threshold. The power monitoring module is further configured to transmit the asserted signal to a power throttling module to initiate a power throttling for the multicore chip.

20 Claims, 6 Drawing Sheets

POWER MANAGEMENT AND CURRENT/RAMP DETECTION MECHANISM

CROSS-REFERENCE TO RELATED APPLICATIONS

This application is a continuation application that claims the benefit and priority to the Non-Provisional U.S. patent application Ser. No. 17/086,264 that was filed on Oct. 30, 2020 which claims the benefit and priority to the U.S. Provisional Patent Application No. 62/966,909, filed Jan. 28, 2020, which are incorporated herein in their entirety by reference.

BACKGROUND

Use of multicore systems have become prevalent in recent years especially in light of technologies such as artificial intelligence (AI) and machine learning (ML). It is appreciated that each of the cores within a multicore system include various components such as an on-chip memory, one or more processing units and/or logic circuits, etc. When one or more of the cores transition from an idle mode to a full operation, a large number of their components, e.g., logic circuits and the on-chip memories, turn on simultaneously, causing a sudden power surge in a short amount of time. If left unthrottled, a sudden power surge may lead to exceeding of maximum power limit. Conventionally, bulk capacitors have been used on the chip to supplement the additional power needed but the type of the bulk capacitor that can be used may be limited by the actual implementation of the chip design. Some conventional systems also utilize a current sensor to deduce power consumption of the board. Unfortunately, the current sensor used to deduce power typically has a slow response time, e.g., 100 s of micro seconds, which may result in violation of the maximum power or the current slew rate specified by peripheral component interface (PCI) specification for the system.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts and the terminology is not intended to be limiting. Unless defined otherwise, all technical and scientific terms used herein have the same meaning as commonly understood in the art to which the embodiments pertain.

A new system and method to trigger a power throttling operation is disclosed. According to some embodiments the amount of current (i.e. power) being drawn by a multicore system, e.g., a chip or a board, is measured by monitoring the multicore system's main power rail (e.g., power supply wires on the chip or board that deliver power from the power source to the multicore system). In some nonlimiting examples, the main power rails may be the input power to the multicore system and the supply power is being monitored. It is appreciated that one or more voltage regulators may be positioned between the power rail and the multicore system. In some nonlimiting examples, the current demand from the multicore system is reflected on the main power rail. In some nonlimiting examples, if the current drawn by the system exceeds a particular threshold, a power throttling is triggered. It is appreciated that in some nonlimiting examples the speed (or slope) at which the current is being drawn or ramped up (also referred to as current slew rate) is monitored and if it exceeds a particular threshold, a power throttling is also triggered. It is appreciated that the thresholds for triggering the power throttling may be user defined and programmable. It is also appreciated that a combination of current ramp detection and the current detection may be utilized. Once a power throttling is triggered by asserting a throttling signal, a power throttling module may throttle power consumption of the multicore system. It is appreciated that a throttling signal that is asserted may have a value 1 to initiate power throttling and the throttling signal that is deasserted may have a value 0 to terminate power throttling.

According to one nonlimiting example, the power throttling is terminated if the power throttling signal is de-asserted due to the current drawn (i.e. power) and/or the speed at which current is being drawn falling below a particular threshold (which may be user defined or programmable). It is appreciated that in some embodiments, the power throttling is terminated after a predetermined amount of time has lapsed, which may also be user defined or programmable. Moreover, it is appreciated that in some nonlimiting examples, the power throttling is terminated after a predetermined amount of time has lapsed or after the power throttling signal is de-asserted, whichever occurs last. It is appreciated that the manner of which power is being throttled may vary and may include lowering the clock frequency, preventing certain cores from processing commands, squashing certain clock pulses, etc.

Figure 1:
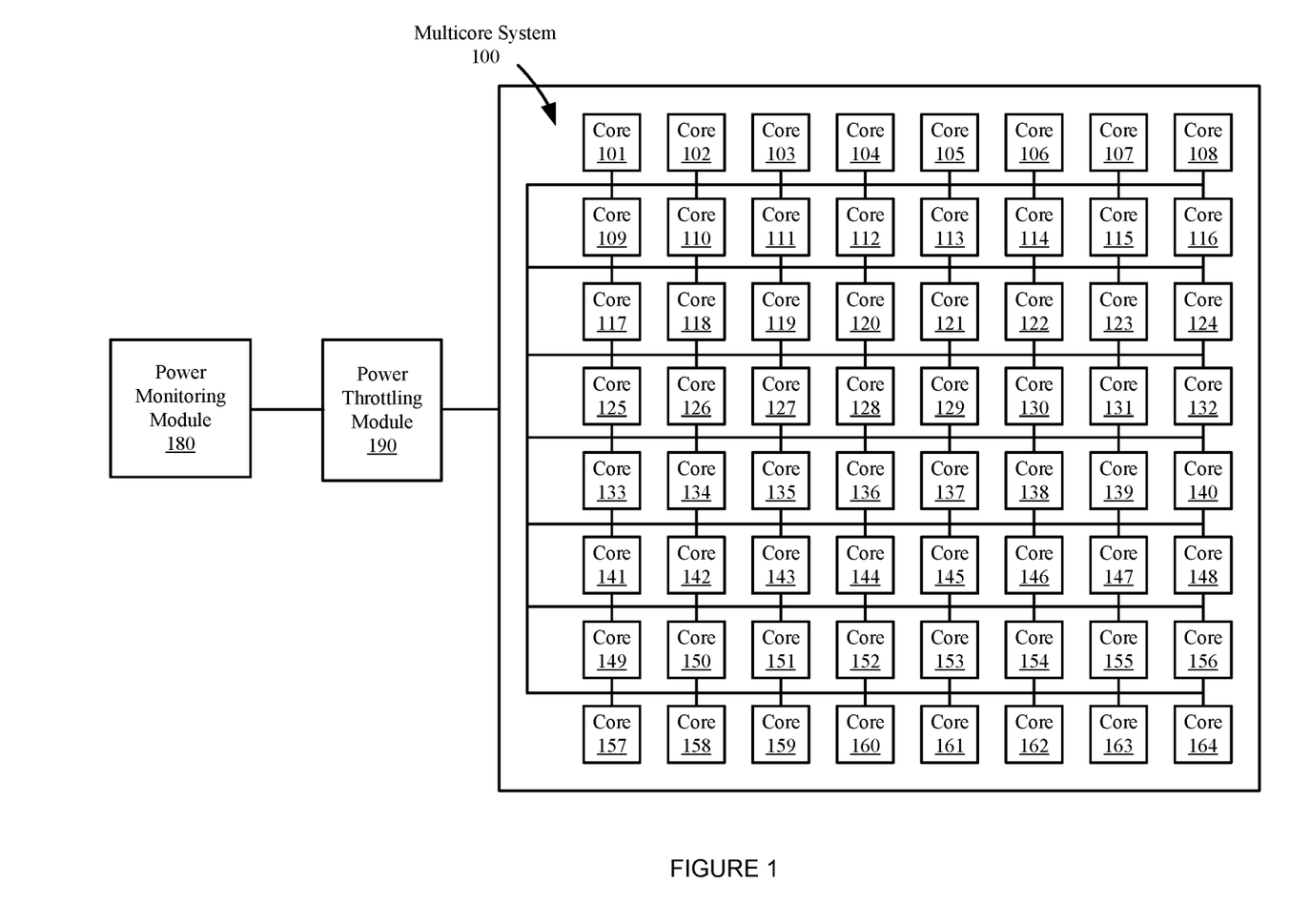
FIG. 1 depicts an example of a diagram of a hardware-based architecture for triggering power throttling according to an aspect of the present embodiments.

FIG. 1 depicts an example of a diagram of a hardware-based architecture for triggering power throttling according to an aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, an architecture includes a multicore system 100 comprising cores 101-164, a power monitoring module 180 and a power throttling module 190. Each of these components in the architecture is a dedicated hardware block/component programmable by a user at a host (not shown) via software instructions for various operations. When the software instructions are executed, each of the hardware components becomes a special purposed hardware component for practicing certain machine learning functions. In some embodiments, the architecture 100 is on a single chip, e.g., a system-on-chip (SOC).

In the example of FIG. 1, the plurality of cores 101-164 in the system 100 are arranged in multiple rows and columns. In this nonlimiting example depicted in FIG. 1, the multicore system 100 includes cores 101-108 in its first row, cores 109-116 in its second row, cores 117-124 in its third row, cores 125-132 in its fourth row, cores 133-140 in its fifth row, cores 141-148 in its sixth row, cores 149-156 in its seventh row, and cores 157-164 in its eight row. It is appreciated that the embodiments are described with respect to 64 cores arranged in 8 rows by 8 columns for illustrative purposes only and should not be construed as limiting the scope of the embodiments. For a nonlimiting example, any number of cores and any number of rows/columns may be used. It is appreciated that the cores 101-164 may be configured to process data, e.g., in an inference engine for ML or AI.

It is appreciated that as a nonlimiting example, a sudden power surge occurs if cores 101-164 transition from idle to operational at the same time or approximately the same time. It is appreciated that in order to prevent a sudden power, the power monitoring module 180 measures a current (i.e. power) being drawn by the multicore system 100. For example, the main power rail for the multicore system 100 may be monitored. It is appreciated that in some nonlimiting examples, the power monitoring module 180 may generate a power throttling signal and transmit the power throttling signal to the power throttling module 190. In some nonlimiting examples, the power throttling signal when asserted causes the power throttling module 190 to throttle power.

In some nonlimiting examples, if the current drawn (i.e. power) by the system 100 exceeds a particular threshold, a power throttling signal generated by the power monitoring module 180 is asserted. It is appreciated that in some nonlimiting examples the speed at which the current is being drawn (also referred to as current ramp detection) is monitored and if it exceeds a particular threshold, a power throttling signal generated by the power monitoring module 180 is asserted. It is appreciated that the thresholds for triggering power throttling may be user programmable. It is also appreciated that a combination of current ramp detection and the current detection may be utilized. Once a power throttling is triggered by asserting a throttling signal, a power throttling module 190 may throttle power consumption of the multicore system 100. It is appreciated that the manner of which power is being throttled may vary and may include lowering the clock frequency, preventing certain cores from processing commands, squashing certain clock pulses, etc.

It is appreciated that the power monitoring module 180 continues monitoring the power rail of the multicore system 100 and de-assert the power throttling signal when the current being drawn, e.g., 10 A or the speed at which the current is drawn falls below a certain threshold, e.g., 2 A/us. The threshold at which the power throttling signal is de-asserted may be user defined or programmable. The power throttling module 190 may receive the de-asserted power throttling signal and may terminate power throttling in response to the de-asserted signal. In one nonlimiting example, the power throttling module 190 may terminate the power throttling after a predetermined amount of time has lapsed or when the power throttling signal is de-asserted, whichever occurs last. It is appreciated that the embodiments are described with respect to asserting a power throttling signal to throttle power when a certain criteria is met (e.g., current ramp exceeding a certain threshold value, current consumption exceeding a certain threshold value, etc.) and de-asserting the power throttling signal when another criteria is met (e.g., current ramp falling below a particular threshold, current consumption or voltage falling below a particular threshold, etc.) for illustrative purposes and should not be construed as limiting the embodiments. For a nonlimiting example, the power throttling signal may be de-asserted in some design in order to initiate power throttling and asserted to terminate it. Moreover, it is appreciated that the criteria to be met for asserting the power throttling signal and de-asserting it may be the same or they may be different. For a nonlimiting example, a criteria to assert the power throttling signal may be if the current consumption exceeds 10 A whereas its criteria to de-assert the power throttling signal may be if the current consumption falls below 5 A.

Figure 2:
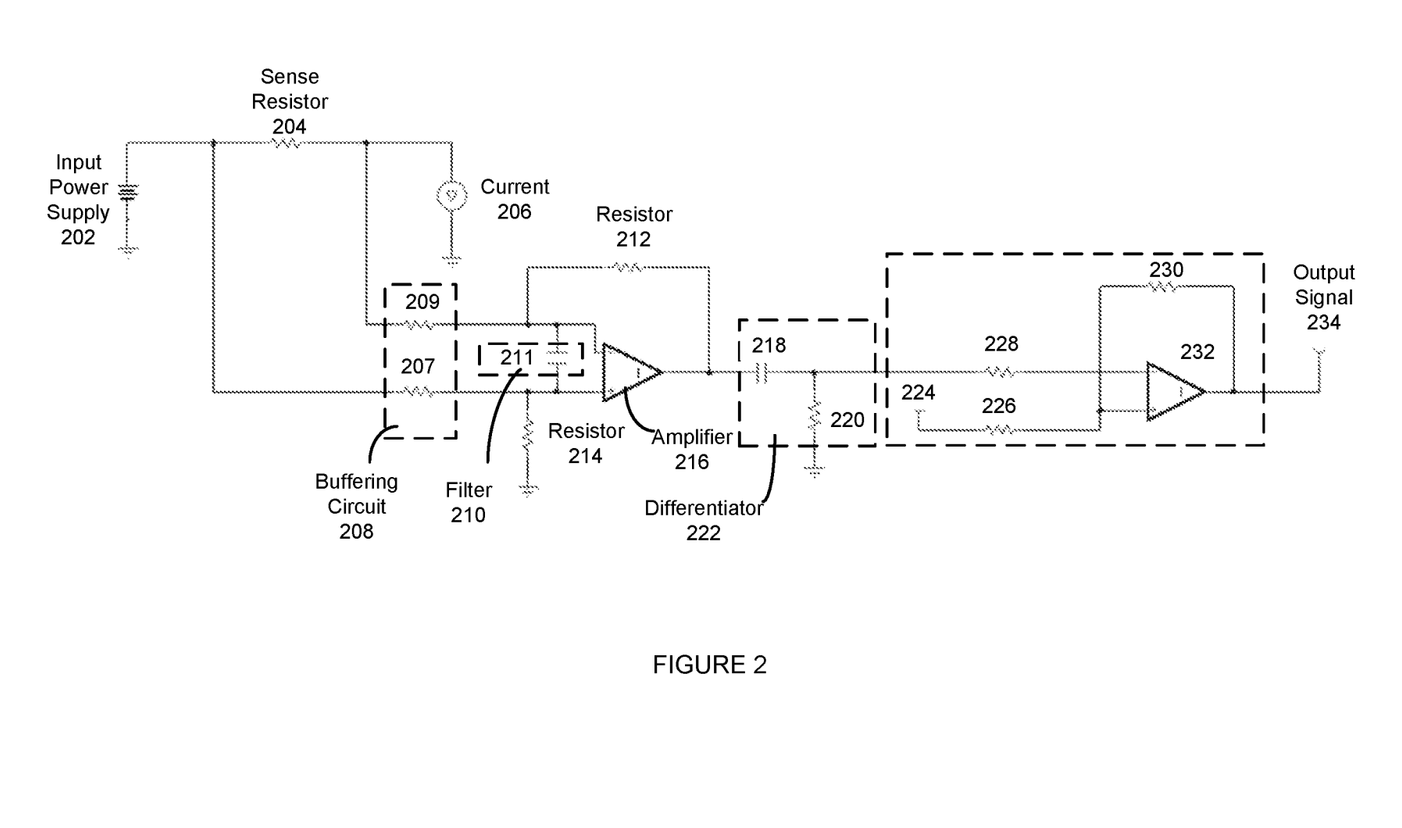
FIG. 2 depicts a nonlimiting example of a current ramp detector for detecting the speed of which current is increased according to an aspect of the present embodiments.

FIG. 2 depicts a nonlimiting example of a current ramp detector within a power monitoring module 180 for detecting the rate at which the current is drawn (e.g., slope of the current ramp up) according to an aspect of the present embodiments. In some embodiments, the input power supply 202 powers the multicore system 100. The sense resistor 204 is configured to sense the current 206 being supplied to the multicore system 100. The buffering circuit 208 may include resistors 207 and 209 to create an input impedance for the differential amplifier 216. The filter 210 may include a capacitor 211 to filter out unwanted noise. Resistors 212, 209, 207, and 214 set the gain of the amplifier 216. The amplifier 216 generate a single ended gain signal from a differential signal. In some embodiments, a differentiator 222 includes a capacitor 218 and a resistor 220 that converts the detected ramp current and converts it into a voltage value. The output of the differentiator 222 is input to a comparator 232 via a resistor 228. The comparator 232 also receives a threshold value 224 that may be programmable through resistors 226 and 230. The threshold value 224 may be the upper bound that if exceeded by the differentiator 222 causes the comparator 232 to assert the output signal 234 high. In some nonlimiting examples, the comparator 232 receives a threshold value 224, e.g., upper bound that if exceeded by the differentiator 222 causes the comparator 232 to assert the output signal 234 high. It is appreciated that the threshold value may be modified to provide two thresholds using resistors 226 and 230 such that the output signal 234 will be asserted high when the output exceeds a value above the threshold 224 but will be asserted low when the output drops below a value below the threshold value 224. It is appreciated that the output signal 234 may be the power throttling signal that is input to the power throttling module 190. It is appreciated that the specific implementation of FIG. 2 and its description setout above is for illustrative purposes and should not be construed as limiting the scope of the embodiments. It is appreciated that the current ramp is continuously monitored and the output signal 234 may be de-asserted if a certain criteria is met, e.g., current ramp falls to a particular threshold value.

Figure 3:
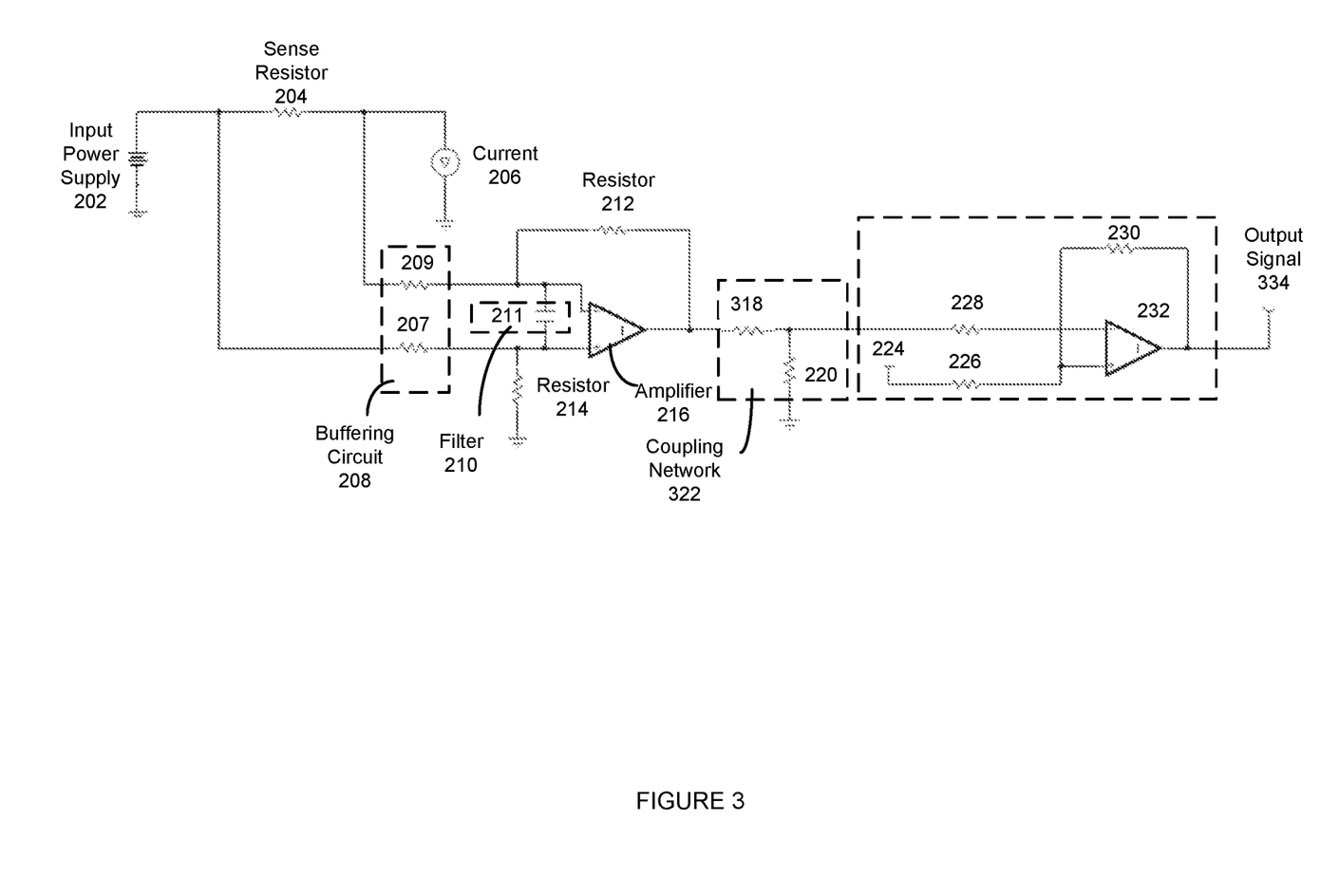
FIG. 3 depicts a nonlimiting example of a current detector for detecting the current use according to an aspect of the present embodiments.

FIG. 3 depicts a nonlimiting example of a current detector for detecting the amount of current use according to an aspect of the present embodiments. FIG. 3 is substantially similar to that of FIG. 2 except that the differentiator 222 that includes the capacitor 218 is replaced with the coupling network 322 that optionally includes a resistor 318, thus detecting current as opposed to current ramp or slope in FIG. 2. The comparator 232 outputs a signal 334 that may be input to the power throttling module 190. It is appreciated that the specific implementation of FIG. 3 and its description setout above is for illustrative purposes and should not be construed as limiting the scope of the embodiments.

It is appreciated that in some nonlimiting examples, the power throttling module 190 may terminate the power throttling in response to receiving a de-asserted power throttling signal. However, it is appreciated that in some nonlimiting examples the power throttling is terminated in response to a different criteria, as described in FIG. 5 below.

Figure 4A:
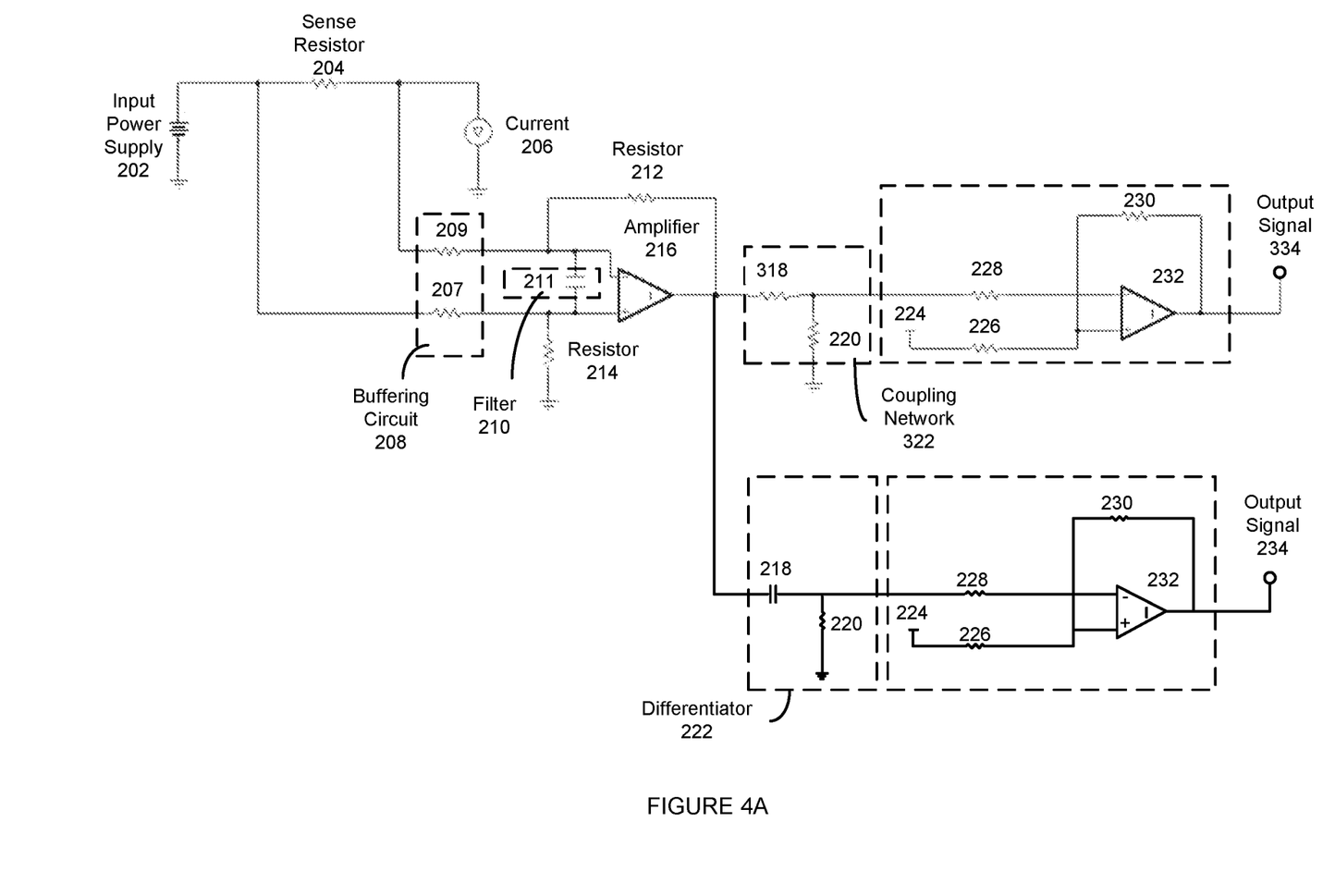
FIG. 4A depicts a nonlimiting example of a current ramp detector and current detector according to an aspect of the present embodiments.

FIG. 4A depicts a nonlimiting example of a current ramp detector and current detector according to an aspect of the present embodiments. FIG. 4A illustrates a power monitoring module 180 that includes both the current ramp detector and the current detector. The output of the amplifier 216 may be input to the coupling networks 322 and 222 in parallel to one another. Each path therefore generates its respective output signals 234 and 334.

Figure 4B:
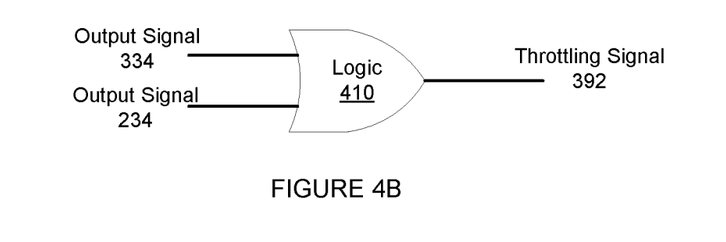
FIG. 4B depicts a nonlimiting example of generating a throttling signal based on the current ramp detector and the current detector according to an aspect of the present embodiments.

FIG. 4B depicts a nonlimiting example of generating a throttling signal based on the current ramp detector and the current detector according to an aspect of the present embodiments. Logic 410 may receive the output signals 234 and 334 and output a throttling signal 392. In some embodiments, if either of the output signals 234 or 334 is asserted, power throttling may be needed. The throttling signal 392 may be input to the power throttling module 190.

Figure 5:
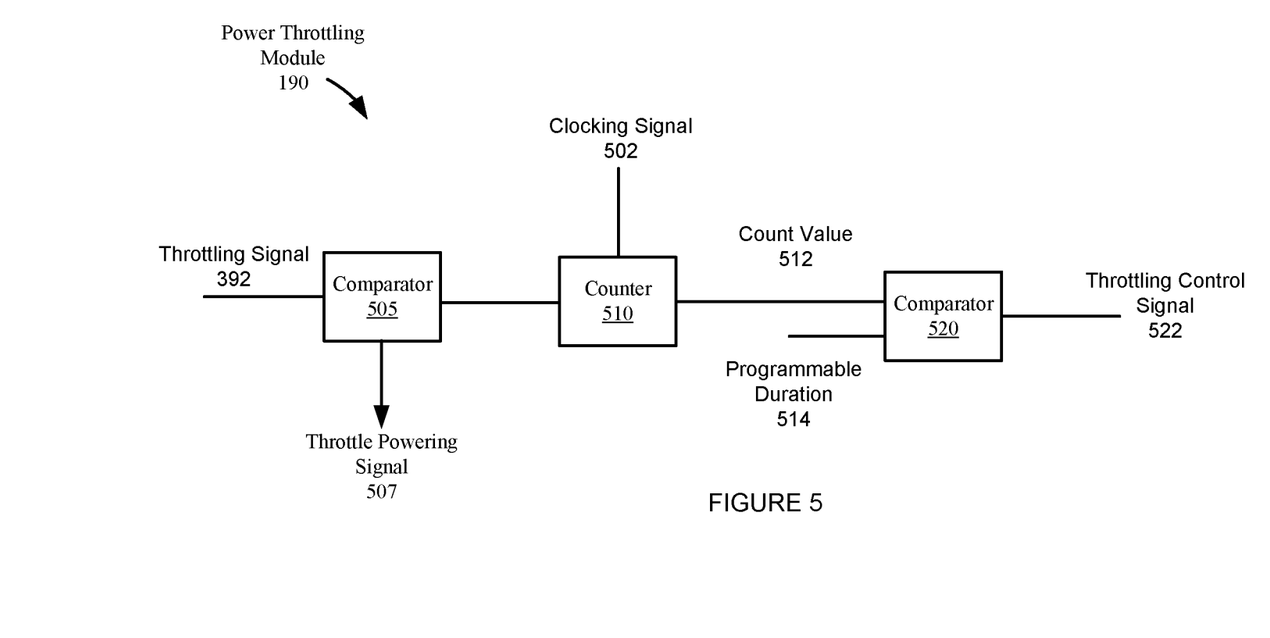
FIG. 5 depicts a power throttling module according to an aspect of the present embodiments.

FIG. 5 depicts a nonlimiting of a power throttling module according to an aspect of the present embodiments. Power throttling module 190 may receive the throttling signal 392 at a comparator 505. It is appreciated that in nonlimiting examples, the power throttling module 190 may receive the output signal 234 or 334 (not shown in FIG. 5) instead of the throttling signal 392. If the throttling signal 392 is asserted high, the comparator 505 generates a throttle powering signal 507 to throttle power of multicore system 100. Otherwise, the throttling signal 392 travels through the counter 510.

The counter 510 may be used to generate a count value 512 associated with the duration at which the throttling signal 392 has been de-asserted. In one nonlimiting example, the counter 510 may count the number of clock pulses of the clocking signal 502 that the throttling signal 392 is de-asserted. Accordingly, the counter 510 determines the duration of which the throttling signal 392 has been de-asserted (after it transitions from being asserted). The comparator 520 may receive the count value 512 as well as a programmable duration 514 and determines the greater between the two. In response to the greater between the two the throttling control signal 522 is generated. For a nonlimiting example, if the count value 512 is greater than the programmable duration 514 then the throttling control signal 522 is generated responsive to the count value 512, otherwise the throttling control signal 522 is generated responsive to the programmable duration 514. In some nonlimiting examples, the throttling control signal 522 causes the power throttling module 190 to terminate power throttling in response thereto.

Figure 6:
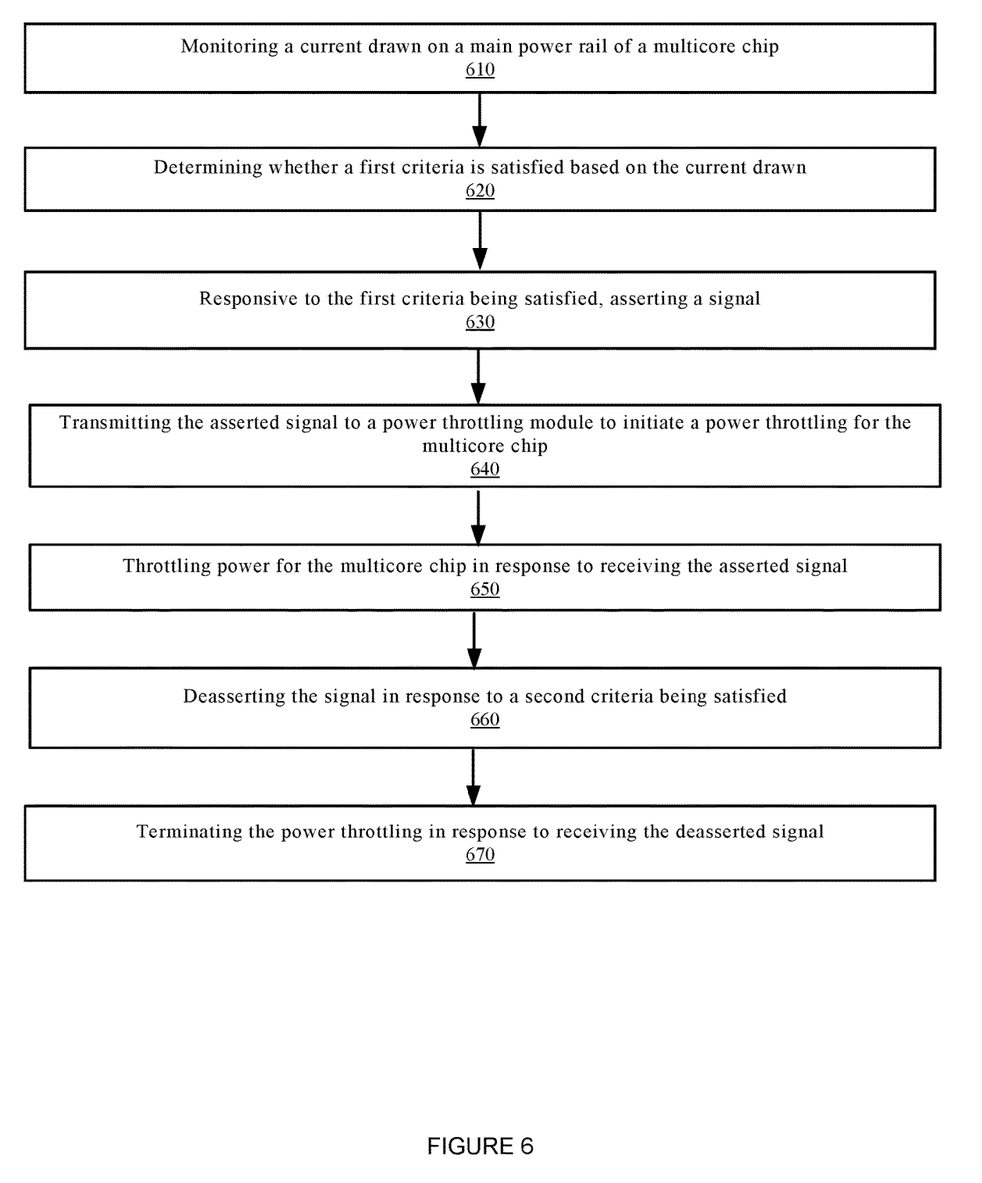
FIG. 6 depicts a flowchart of a nonlimiting example of power management and triggering power throttling according to an aspect of the present embodiment.

FIG. 6 depicts a flowchart of a nonlimiting example of power management and triggering power throttling according to an aspect of the present embodiment. At step 610, a current drawn on a main power rail of a multicore chip is monitored. Accordingly, a current ramp or actual current being drawn by the multicore system can be determined. At step 620, it is determined whether a first criteria, e.g., threshold for current ramp, threshold for current drawn, etc., is satisfied based on the current drawn. At step 630, responsive to the first criteria being satisfied, a signal is asserted, e.g., power throttling signal. At step 640, the asserted signal is transmitted to a power throttling module to initiate a power throttling for the multicore chip. At step 650, the power throttling module throttles power for the multicore system in response to receiving the asserted signal. At step 660, the signal is de-asserted in response to a second criteria being satisfied, e.g., current ramp falling to lower current ramp threshold, current drawn falling to a lower current threshold, etc. At step 670, the power throttling may be terminated in response to receiving the de-asserted signal.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:
1. A system comprising:
   a multicore chip comprising a plurality of cores configured to perform one or more power-consuming operations;
   a power monitoring module configured to measure power consumption of the multicore chip; and
   a power throttling module configured to initiate a power throttling for the multicore chip if the measured power consumption exceeds a first threshold, wherein the power throttling module is configured to prevent at least one or more cores of the multicore chip from processing commands responsive to the initiating the power throttling, and wherein the power throttling module is further configured to terminate power throttling after a predetermined amount of time has lapsed.

2. The system of claim 1, wherein the power throttling module is further configured to throttle power for the multicore chip in response to receiving an asserted signal.

3. The system of claim 2, wherein the power monitoring module is further configured to de-assert the asserted signal in response to the measured power consumption falling to a second threshold.

4. The system of claim 3, wherein the power throttling module is configured to terminate power throttling of the multicore chip in response to receiving the de-asserted signal.

5. The system of claim 2, wherein the power monitoring module is further configured to de-assert the asserted signal in response to the measured power consumption falling to the second threshold or after a predetermined amount of time has lapsed, whichever occurs last.

6. The system of claim 1, wherein the power monitoring module is further configured to measure a ramp current of the multicore chip, wherein the ramp current is a speed of which current consumption of the multicore chip is increasing, and wherein the power throttling is initiated in response to the measured ramp current exceeding a third threshold.

7. A system comprising:
a multicore chip comprising a plurality of cores configured to perform one or more power-consuming operations; and
a power monitoring module configured to measure a ramp current of the multicore chip, wherein the ramp current is a speed of which current consumption of the multicore chip is increasing; and
a power throttling module configured to initiate a power throttling for the multicore chip if the measured ramp current exceeds a first threshold, wherein the power throttling module is configured to squash at least one or more clock pulses responsive to the initiating the power throttling, and wherein the power throttling module is further configure to terminate power throttling after a predetermine amount of time has lapsed.

8. The system of claim 7, wherein the power throttling module is configured to throttle power for the multicore chip in response to receiving the asserted signal.

9. The system of claim 8, wherein the power monitoring module is further configured to de-assert an asserted signal in response to the measured ramp current falling to a second threshold.

10. The system of claim 9, wherein the power throttling module is configured to terminate power throttling of the multicore chip in response to receiving the de-asserted signal.

11. The system of claim 7, wherein the power monitoring module is further configured to de-assert the asserted signal in response to the measured power consumption falling to the second threshold or after a predetermined amount of time has lapsed, whichever occurs last.

12. A method comprising:
monitoring a current drawn of a multicore chip;
determining whether a first criteria is satisfied based on the current drawn;
responsive to the first criteria being satisfied, initiating a power throttling for the multicore chip by preventing at least one or more cores of the multicore chip from processing commands or by squashing at least one or more clock pulses; and
terminating the power throttling in response to a second criteria being satisfied, wherein the second criteria is whether a certain period of time has lapsed.

13. The method of claim 12 further comprising terminating the power throttling in response to a power consumption of the multicore chip falling to a certain threshold value.

14. The method of claim 12 further comprising terminating the power throttling in response to a ramp current falling below a certain threshold value, wherein the ramp current is a speed of which current consumption of the multicore chip is increasing.

15. The method of claim 12, wherein the first criteria is whether a power consumption of the multicore chip exceeds a first threshold value.

16. The method of claim 12, wherein the first criteria is whether a ramp current exceeds a first threshold value, wherein the ramp current is a speed of which current consumption of the multicore chip is increasing.

17. A system comprising:
a multicore chip comprising a plurality of cores configured to perform one or more power-consuming operations;
a power monitoring module configured to measure power consumption of the multicore chip; and
a power throttling module configured to initiate a power throttling for the multicore chip if the measured power consumption exceeds a first threshold, wherein the power throttling module is further configured to terminate the power throttling in response to the measured power consumption falling to a second threshold or after a predetermined amount of time has lapsed, whichever occurs last.

18. A system comprising:
a multicore chip comprising a plurality of cores configured to perform one or more power-consuming operations; and
a power monitoring module configured to measure a ramp current of the multicore chip, wherein the ramp current is a speed of which current consumption of the multicore chip is increasing; and
a power throttling module configured to initiate a power throttling for the multicore chip when the measured ramp current exceeds a first threshold, wherein the power throttling module is further configured to terminate the power throttling in response to the measured power consumption falling to a second threshold or after a predetermined amount of time has lapsed, whichever occurs last.

19. A method comprising:
monitoring a current drawn of a multicore chip;
determining whether a first criteria is satisfied based on the current drawn, wherein the first criteria is whether a ramp current exceeds a first threshold value, wherein the ramp current is a speed of which current consumption of the multicore chip is increasing;
responsive to the first criteria being satisfied, initiating a power throttling for the multicore chip; and
in response to the measured ramp current falling to a second threshold value, terminating the power throttling of the multicore chip.

20. A system comprising:
a means for monitoring a current drawn of a multicore chip;

a means for determining whether a first criteria is satisfied based on the current drawn, wherein the first criteria is whether a ramp current exceeds a first threshold value, wherein the ramp current is a speed of which current consumption of the multicore chip is increasing;
a means for initiating a power throttling for the multicore chip responsive to the first criteria being satisfied; and
a means for terminating the power throttling of the multicore chip in response to the measured ramp current falling to a second threshold value.

* * * * *